United States Patent [19]

Copeland

[11] Patent Number: 5,037,561
[45] Date of Patent: Aug. 6, 1991

[54] METHOD FOR DRYING BIOLOGICAL SLUDGE

[76] Inventor: Brian J. Copeland, 422 Collen, Lombard, Ill. 60148

[21] Appl. No.: 339,189

[22] Filed: Apr. 14, 1989

[51] Int. Cl.$^5$ .................................................. C02F 11/12
[52] U.S. Cl. ................................... 210/769; 210/770; 210/787; 34/9; 34/12; 110/346
[58] Field of Search .................................... 210/769–771, 210/774, 787, 790, 806, 807; 110/346; 34/9, 10, 12, 39

[56] References Cited
U.S. PATENT DOCUMENTS

| | | | |
|---|---|---|---|
| 4,050,390 | 9/1977 | Hara et al. | 210/771 X |
| 4,119,538 | 10/1978 | Yamauchi et al. | 210/771 X |
| 4,196,676 | 4/1980 | Brown et al. | 110/245 |
| 4,330,411 | 5/1982 | Florin et al. | 210/769 |
| 4,769,157 | 9/1988 | Bassler et al. | 210/758 |
| 4,777,889 | 10/1988 | Smith | 110/245 |
| 4,793,937 | 12/1988 | Meenan et al. | 210/771 |

Primary Examiner—Tom Wyse
Attorney, Agent, or Firm—Marshall, O'Toole, Gerstein, Murray & Bicknell

[57] ABSTRACT

The present invention relates to a process to pretreat aqueous biological sludge in order to provide combustibles solids to an autogenous combustion system used to thermally oxidize the sludge.

3 Claims, 2 Drawing Sheets

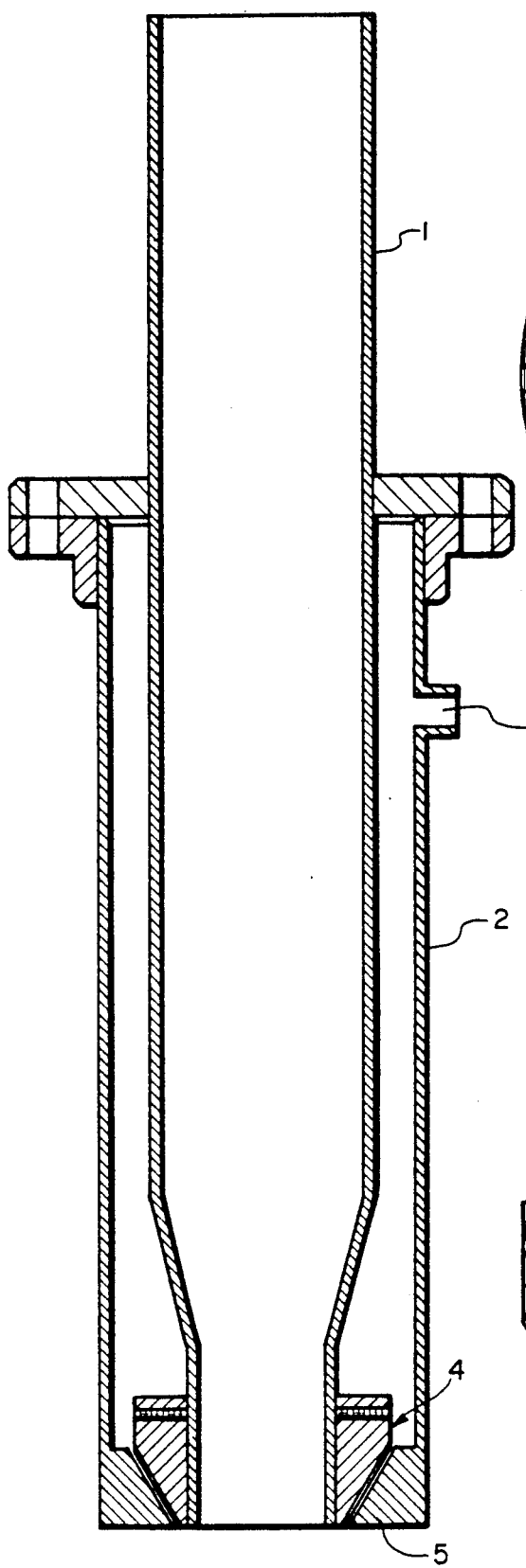
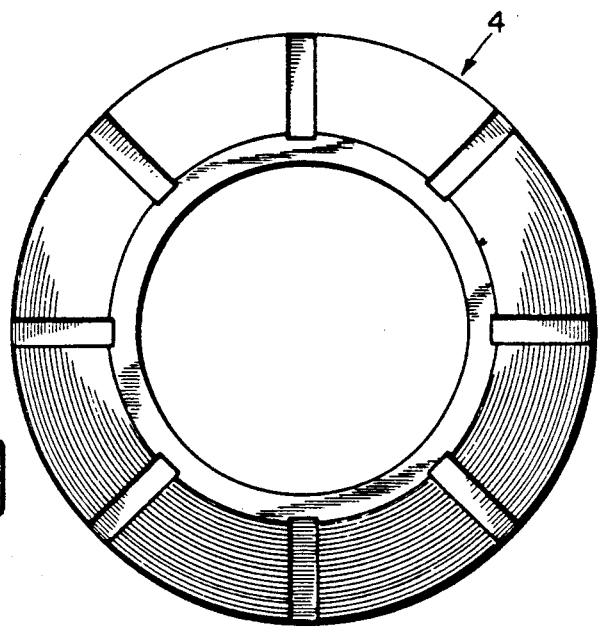
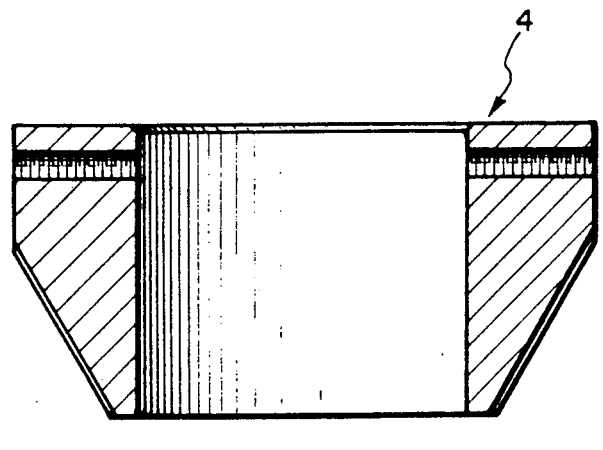

ature of approximately 200° F.
METHOD FOR DRYING BIOLOGICAL SLUDGE

FIELD OF THE INVENTION

The present invention relates to a process using a fluidized bed dryer in the treatment and disposal of aqueous biological sludges by thermal oxidation.

BACKGROUND OF THE INVENTION

The use of fluidized bed combustors to thermally oxidize various types of municipal and industrial wastes are known. For example, U.S. Pat. No. 4,196,676 to Brown et al. discloses using a fluidized bed for burning log yard waste and U.S. Pat. No. 4,777,889 to Smith discloses using a fluidized bed combustion apparatus for burning heterogeneous solid waste material, particularly materials usually found in municipal waste.

Further, U S. Pat. No. 4,769,157 to Bassler et al. discloses a process for drying sludges using a drying gas produced by the partial oxidation of sludge dried using a fluidized bed. Exhaust gases resulting from the disclosed drying process are used to produce combustible materials necessary to maintain the temperature of the bed. The present invention preferably uses a fluidized bed to dry wet sludge and the dried sludge is combined with wet sludge to give a mixture which supports autogenous combustion in a primary combustion system. The sludge is preferably sprayed onto the top of a fluidized bed under conditions selected to allow recovery of solid transportable dried combustibles which are directed to the primary combustion system for thermal oxidation.

SUMMARY OF THE INVENTION

The present invention relates to a process for treating aqueous biological sludge comprising; directly drying aqueous sludge with heated air from a fluidized bed, indirectly drying the sludge with heat supplied from heat transfer surfaces immersed in the fluidized bed and mixing a portion of the dried sludge with the aqueous sludge to provide a mixture that is capable of self-sustaining combustion.

It is an object of this invention to utilize clean hot air to pre-dry biological sludges in order to convert the sludges into a form suitable for use as a fuel able to support autogenous combustion.

It is an advantage of this invention to dry biological sludges with a fluidized bed dryer because a single apparatus can be used to perform a multiplicity of functions needed to efficiently oxidize aqueous biological sludges.

Further aspects and advantages of the present invention will be apparent upon consideration of the following detailed description of the preferred embodiment thereof along with the drawings.

BRIEF DESCRIPTION OF THE DRAWINGS

FIGS. 2 and 3A-B illustrate a preferred embodiment or a sonic nozzle used to inject wastes into fluidized beds.

DETAILED DESCRIPTION OF THE DRAWING

Figure 1:
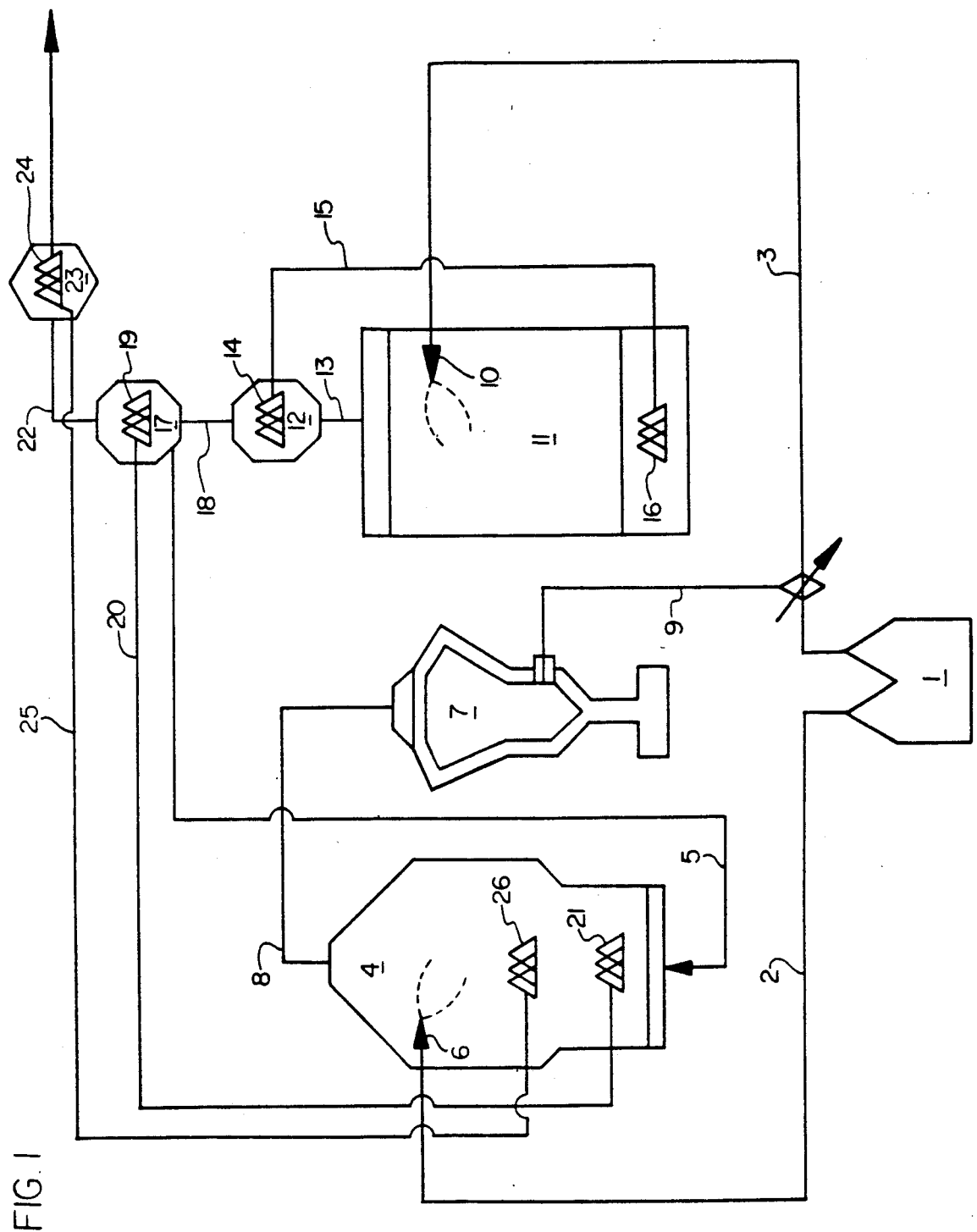
FIG. 1 schematically illustrates the various apparatus needed to practice the process of the invention of using biological wastes a fuel in an autogenous combustor.

FIG. 1 illustrates apparatus suitable for the practice of the present invention when biological sludge is to be treated for use as fuel in an autogenous combustor. A sludge feed system, 1, preferably includes belt filter presses which deliver sludge to hydraulic sludge feed pumps. The sludge is regulated and transported through conduits 2 and 3 to a fluidized bed dryer and a combustor, approximately one-third of the sludge is transported to a fluidized bed dryer, 4. The dryer includes a particle bed, which is fluidized by preheated air supplied under pressure from a pump through a conduit 5, into a plenum chamber and through a constriction plate which supports the fluidized bed. The air heat next moves into a reactor freeboard space and then into a secondary heat recovery system. Air passing through the particle bed keeps the particles thereon in a state of fluid motion, presenting a large surface area for drying the wet biological sludge fed onto the bed.

The dryer receives aqueous sludge of about 25% total solids through a sonic atomizer 6 and dries it at a temperature of approximately 200° F.

The sonic atomizer efficiently conveys and disperses the highly viscous biological sludge. Preferably, the biological sludge is conveyed through a non-restrictive channel; the nominal size for this channel will vary between 0.25 inches to 12 inches in diameter. Conveying pressure can be as little as 1 PSIG and as high as 300 PSIG.

A preferred sonic nozzle is shown in FIG. 2. Sludge enters a conduit 1 which is removably fitted within a conduit 2. Conduit 2 is fitted with a pressurized gas entry port 3 and a retaining lip 5. A slotted nozzle tip 4, shown in FIGS. 3A–3B is attached to conduit 1 and contacts the retaining lip of conduit 2 when assembled.

At the point of entrance into the combustion or drying cavity the viscous sludge is exposed to atomizing gases such as air or steam. These atomized gases are at or near sonic velocities and have an apparent point of convergence at or near the downstream geometric center of the sludge stream.

The high velocity of the gases in combination with sonic resonance atomize and disperse the sludge into particle sizes suitable for drying. One of ordinary skill in the art would readily ascertain how to adjust gas velocity, as well as disbursement angle in order to optimize operating performance.

The dried sludge is then transferred into a cyclone separator 7, through a conduit 8. A preferred separator is of the cyclonic type and operates to remove the particulate material from the gaseous effluent of the dryer using centrifugal force. Operating temperatures are equivalent to the dryers discharge temperature. The cyclone however, is heated and/or insulated to insure the inner cyclone shell temperatures are in excess of the dryer exit gas dew point. Preferably, heated air is supplied through air distribution tubes oriented parallel to the plane of the inner shell surfaces. Particulate material is then transported from the separator through a conduit 9.

A cyclone suitable to practice the present invention normally operates with inlet velocities from about 40 to about 100 ft/sec. and with operating differential pressures from about one to about 15 inches of water column.

The particulate dried sludge is then mixed with the remaining two-thirds of the aqueous sludge. The resulting mixture, which is capable of self-sustaining combustion, is then sonically atomized through a nozzle 10 and sprayed into a combustor 11.

The combustor may either be a multiple hearth furnace or a fluidized bed reactor. Suitable reactors are described in U.S. Pat. No. 3,462,246 to Copeland and U.S. Pat. No. 3,653,843 to Seelander, the disclosure of both patents being completely incorporated by reference into the present application. Combustion of the sludge and dried sludge mixture occurs at approximately 1550° F. The resulting products of combustion are oxygen, nitrogen, carbon dioxide, water vapor and ash.

The products of combustion are then transported from the combustor to a primary recuperator 12 through a conduit 13. The hot flue gases from the combustor are passed through a heat exchanger within the primary recuperator. Heated air from the heat exchanger 14 is then recycled through a conduit 15 into a combustor heat exchanger 16 at approximately 1000° F. to 1200° F. to support the autogenous combustion of the sludge and particulate mixture.

A secondary recuperator 17 receives gases from the primary recuperator at approximately 980° F. through a conduit 18. The gas also passes through a heat exchanger 19 within the secondary recuperator. The air heated in the heat exchanger is then recycled through a conduit 20 to a heat exchanger 21 in the dryer where it serves to preheat air used to generate the fluidized bed.

Flue gases exiting the secondary recuperator are transported through a conduit 22 to an economizer 23. The flue gases are cooled in a heat exchanger 24 by a heat transfer media which is preferably ethylene glycol. The media is then circulated through a conduit 25 to a heat exchanger 26 that is immersed in the fluidized bed of the dryer for indirectly drying biological sludge. If any portion of the heat generated in the heat exchanger is not required in the dryer, the excess heat may be used to support other mechanical systems within the plant.

I claim:
1. A process for treating aqueous biological sludge comprising:
   i) directly drying aqueous biological sludge with heat supplied from a fluidized particle bed to obtain a dried sludge wherein the fluidized bed is equipped with means for feeding heated and pressurized air through a constriction plate comprising a plurality of orifices each orifice having a first end lying substantially in a first plane below the constriction plate and a second end lying substantially in a second plane above the constriction plate and the first and second ends of the orifices remain substantially within the respective planes during expansion and contraction of the constriction plate, wherein the plate supports a bed of fluidizable particles that have a flowing movement relative to each other and to the plate;
   ii) indirectly drying the aqueous sludge with heat supplied from heat transfer surfaces immersed in the fluidized bed;
   iii) mixing a portion of the dried sludge with the aqueous sludge to obtain a mixture wherein the mixture is capable of self-sustaining combustion; and
   iv) transporting the mixture to a primary combustion system, wherein the combustion of the mixture is autogenous.

2. A process according to claim 1 wherein the heat transfer surfaces are membrane wall surfaces.

3. A process according to claim 2 wherein the plurality of orifices are oriented parallel to the plane of the membrane wall surfaces.

* * * * *